US012750867B2

(12) United States Patent
Zhang et al.

(10) Patent No.: US 12,750,867 B2
(45) Date of Patent: Sep. 29, 2026

(54) MECHANISM FOR MULTICAST AND BROADCAST SERVICE

(71) Applicant: Lenovo (Beijing) Limited, Beijing (CN)

(72) Inventors: Congchi Zhang, Shanghai (CN); Mingzeng Dai, Shanghai (CN); Lianhai Wu, Beijing (CN); Haipeng Lei, Beijing (CN); Hyung-Nam Choi, Ottobrunn (DE); Joachim Löhr, Wiesbaden (DE); Prateek Basu Mallick, Dreieich (DE); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 404 days.

(21) Appl. No.: 18/271,378

(22) PCT Filed: Jan. 14, 2021

(86) PCT No.: PCT/CN2021/071816

§ 371 (c)(1),
(2) Date: Jul. 7, 2023

(87) PCT Pub. No.: WO2022/151181

PCT Pub. Date: Jul. 21, 2022

(65) Prior Publication Data

US 2024/0098761 A1 Mar. 21, 2024

(51) Int. Cl.

*H04W 72/30* (2023.01)
*H04W 72/232* (2023.01)
*H04W 76/20* (2018.01)

(52) U.S. Cl.

CPC ......... *H04W 72/30* (2023.01); *H04W 72/232* (2023.01); *H04W 76/20* (2018.02)

(58) Field of Classification Search

CPC ... H04W 72/30; H04W 72/232; H04W 76/20; H04W 76/40; H04W 4/06; H04W 48/12; H04L 67/34

See application file for complete search history.

(56) References Cited

U.S. PATENT DOCUMENTS

2014/0044072 A1* 2/2014 Piggin .................. H04W 72/30 370/329
2014/0119263 A1* 5/2014 Shauh ..................... H04L 5/001 370/312

(Continued)

FOREIGN PATENT DOCUMENTS

CN 109983789 A 7/2019
CN 111866751 A 10/2020

(Continued)

OTHER PUBLICATIONS

PCT/CN2021/071816 , "International Preliminary Report on Patentability", PCT Application No. PCT/CN2021/071816, Jul. 27, 2023, 5 pages.

(Continued)

*Primary Examiner* — Habte Mered
(74) *Attorney, Agent, or Firm* — FIG. 1 Patents

(57) ABSTRACT

Embodiments of the present disclosure relate to Multicast and Broadcast Service (MBS) services. The method includes receiving configuration information from a network device, the configuration information relating to a multicast and broadcast service (MBS) service provided in one or more serving cells. The method also includes receiving downlink control information from the one or more serving cells in which the MBS service is provided. The method further includes receiving the MBS service that is provided in the one or more serving cells based on the downlink control information.

20 Claims, 7 Drawing Sheets

(56) References Cited

U.S. PATENT DOCUMENTS

| | | | | |
|---|---|---|---|---|
| 2014/0269566 | A1 | 9/2014 | Wang et al. | |
| 2017/0332377 | A1* | 11/2017 | Tseng | H04W 72/0446 |
| 2019/0075614 | A1* | 3/2019 | Li | H04L 51/58 |
| 2019/0132141 | A1* | 5/2019 | Li | H04L 12/185 |
| 2019/0174529 | A1 | 6/2019 | Tie et al. | |
| 2023/0023919 | A1* | 1/2023 | Qi | H04W 4/06 |
| 2023/0046529 | A1* | 2/2023 | Baek | H04W 76/40 |
| 2023/0050307 | A1* | 2/2023 | Zhou | H04W 72/23 |
| 2023/0093727 | A1* | 3/2023 | Lin | H04L 5/0053 370/312 |
| 2023/0179963 | A1* | 6/2023 | Fujishiro | H04W 48/20 370/328 |
| 2023/0180269 | A1* | 6/2023 | Li | H04W 72/30 370/312 |
| 2023/0188948 | A1* | 6/2023 | Zhu | H04W 4/06 370/329 |
| 2024/0032070 | A1* | 1/2024 | Zhou | H04W 72/30 |

FOREIGN PATENT DOCUMENTS

| | | | |
|---|---|---|---|
| CN | 111866975 | A | 10/2020 |
| WO | 2015123885 | A1 | 8/2015 |
| WO | 2018032469 | A1 | 2/2018 |

OTHER PUBLICATIONS

PCT/CN2021/071816 , “International Search Report and Written Opinion”, PCT Application No. PCT/CN2021/071816, Oct. 20, 2021, 6 pages.

“Communication Pursuant to Article 94(3) EPC”, EP Application No. 21918389.4, Mar. 27, 2025, 10 pages.

21918389.4 , “European Search Report”, Application No. 21918389.4, Jul. 26, 2024, 11 pages.

Foreign Office Action issued in CN 202180090183.9, mailed Apr. 14, 2026, 5 pages.

* cited by examiner

MECHANISM FOR MULTICAST AND BROADCAST SERVICE

FIELD

The present disclosure relates generally to wireless communications, and more particularly to wireless communications systems, devices, methods, and computer readable medium for Multicast and Broadcast Service (MBS).

BACKGROUND

The "background" description provided herein is for the purpose of generally presenting the context of the disclosure. Work of the presently named inventors, to the extent it is described in this background section, as well as aspects of the description which cannot otherwise qualify as prior art at the time of filing, are neither expressly or impliedly admitted as prior art against the present invention.

With development of communication technologies, several solutions have been proposed to provide efficient and reliable solutions for communication. For example, MBS has been proposed. The term "MBS" used herein refers to a point-to-multipoint communication scheme where data packets are transmitted simultaneously from a single source to multiple destinations. In a scenario of MBS, it can achieve efficient use of radio and network resources while transmitting audio and video content to a large group of end users. The term broadcast refers to the ability to deliver content to all users. The term "multicast", on the other hand, refers to distribution of content among a specific group of users that are subscribed to those services. The multicast and broadcast content is transmitted over a geographical area referred to as a zone.

SUMMARY

In general, example embodiments of the present disclosure provide a solution for MBS.

An exemplary embodiment of the present disclosure provides a method performed by a terminal device. The method includes receiving configuration information from a network device, the configuration information relating to a MBS service, provided in one or more serving cells. The method further includes receiving downlink control information from the one or more serving cells in which the MBS service is provided. The method yet includes receiving the MBS service that is provided in the one or more serving cells based on the downlink control information.

An exemplary embodiment of the present disclosure provides a method of performed by a network device. The method comprises determining configuration information relating to a MBS service for a terminal device. The method also comprises transmitting the configuration information to the terminal device. The configuration information indicates one or more serving cells for providing the MBS service.

An exemplary embodiment of the present disclosure provides a terminal device. The first terminal device includes a processor, and a memory coupled to the processor and storing instructions thereon, the instructions, when executed by the processor, causing the first terminal device to perform the method according to the first aspect.

An exemplary embodiment of the present disclosure provides a network device. The second terminal device includes a processor, and a memory coupled to the processor and storing instructions thereon, the instructions, when executed by the processor, causing the network device to perform the method according to the second aspect.

In a fifth aspect, there is provided a computer readable medium having instructions stored thereon, the instructions, when executed on at least one processor, causing the at least one processor to carry out the method according to the first aspect.

In a sixth aspect, there is provided a computer readable medium having instructions stored thereon, the instructions, when executed on at least one processor, causing the at least one processor to carry out the method according to the second aspect.

This Summary is provided to introduce a selection of embodiments described herein in simplified forms that are further described below in the Detailed Description along with other embodiments. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

The term "UE" can be interchanged in this specification with the broader term "electronic device" and vice versa.

BRIEF DESCRIPTION OF THE DRAWINGS

The scope of the present disclosure is best understood from the following detailed description of exemplary embodiments when read in conjunction with the accompanying drawings, wherein.

Figure 1:
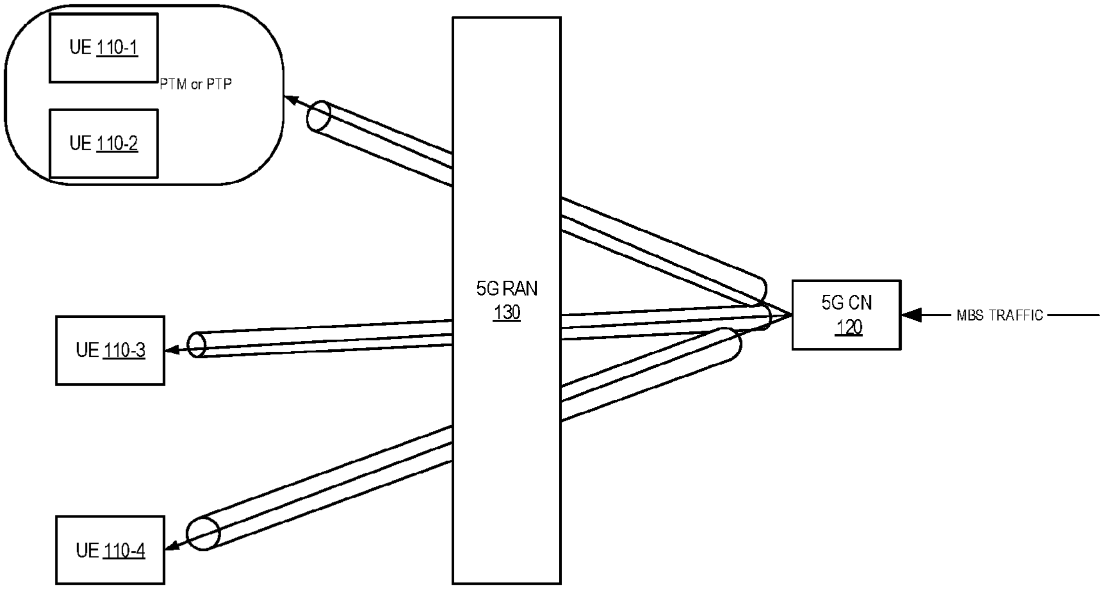
FIG. 1 illustrates a schematic diagram of MBS delivery according to conventional technologies.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service.

| ABBREVIATIONS | |
|---|---|
| 3GPP | 3rd Generation Partnership Project |
| CN | Core Network |
| UE | User Equipment |

-continued

| ABBREVIATIONS | |
|---|---|
| 5G | The fifth generation |
| RRC | Radio Resource Control |
| MBS | Multicast and Broadcast Service |
| NR | New Radio |
| CA | Carrier Aggregation |
| RAN | Radio Access Network |
| MAC | Medium Access Control |
| PHY | Physical Layer |
| NG-RAN | Next Generation Radio Access Network |
| NAS | Non-access Stratum |
| AS | Access Stratum |
| PLMN | Public Land Mobile Network |
| TMGI | Temporary Mobile Group Identity |
| UL | Uplink |
| DL | Downlink |
| PCell | Primary Cell |
| SCell | Secondary Cell |
| 5GC | The Fifth Generation Core Network |

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning us commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices or evolved MTC (eMTC) devices, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" can be used interchangeably.

Communication discussed herein can conform to any suitable wireless interface standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, such communication can be performed according to any communication protocol either currently known or to be developed in the future. Examples of the communication protocols include, but are not limited to, the first generation (1G), the second generation (2G), 2.50, 2.75G, the third generation (3G), the fourth generation (4G), 4.5G, the fifth generation (5G) communication protocols. The techniques described herein can be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like can refer to different or same objects. Other definitions, explicit and implicit, can be included below.

In some examples, values, procedures, or apparatus are referred to as "best." "lowest," "highest," "minimum." "maximum," or the like. It will be appreciated that such descriptions are intended to indicate that a selection among many used functional alternatives can be made, and such selections need not be better, smaller, higher, or otherwise preferable to other selections.

As mentioned above, the MBS has been proposed. Some MBS services can only target UEs within a certain area, which can be named as "local MBS services." The following principles can be applied to support local MBS services:

It shall be possible to support MBS session where content of the MBS service is not location-dependent, but the distribution of the content is limited to a certain area, and MBS sessions where the content is location-dependent.

It shall be possible to locate MBS CN functions in proximity to NG RAN nodes serving the location area.

For the case that the multicast service is only available within a limited area, the UE shall be able to obtain service area information of the multicast service, to enable the UE to trigger the session join procedure only within the location area.

The UE shall be able to obtain service area information of the local multicast service via NAS signaling or via MBS service announcement.

For the case that the MB service content is location-dependent, which means that the content of the same MB service delivered to different sub-areas is different, it shall be possible that the UE is not aware of each sub-area in the available area information of the MB service.

It shall be possible to hide the internal PLMN topology from Application Function (AF).

The network shall be able to enforce the area restriction for accessing a local MBS service.

If different location-dependent content is provided for an MBS session, the network shall be able to support multiple ingress points for an MBS session.

To support different location-dependent content, an additional identifier (for example, FlowID) shall be assigned for each location area and used in combination with the multicast session ID/TMGI in network internal signaling to identify a location dependent part of the multicast session.

Information about the location dependent multicast service may be provided by an AF, or may be configured.

Meanwhile, a UE can be configured with carrier aggregation (CA) and served by one primary cell of a master or secondary cell group (SpCell) and one or multiple secondary cells (SCells). The term "carrier aggregation" used herein refers to a technique used in wireless communication to increase the data rate per user, whereby multiple frequency blocks (called component carriers) are assigned to the same user. There are a few issues when supporting (local) MBS service under CA scenario:

According to conventional technologies, a configuration of a single cell point-to-multipoint (SC-PTM) service can be provided in SCPTMConfiguration sent over a single cell multicast control channel (SC-MCCH). The SCPTMConfiguration message can contain control information applicable for MBMS services transmitted via single cell-multimedia broadcast multicast service signal frequency network (SC-MBSFN) radio bearer (SC-MRB). Table 1 below shows an example of a SCPTMConifugration message. Table 2 below shows field descriptions of the SCPTMConifugration message.

TABLE 1

```
-- ASN1START
SCPTMConfiguration-r13 ::=        SEQUENCE {
   sc-mtch-InfoList-r13              SC-MTCH-InfoList-r13,
   scptm-NeighbourCellList-r13          SCPTM-NeighbourCellList-r13
   OPTIONAL,    -- Need OP
   lateNonCriticalExtension          OCTET STRING                   OPTIONAL,
   nonCriticalExtension              SCPTMConfiguration-v1340       OPTIONAL
}
SCPTMConfiguration-v1340 ::= SEQUENCE {
   p-b-r13                              INTEGER (0..3)           OPTIONAL,-- Need ON
   nonCriticalExtension                 SEQUENCE { }               OPTIONAL
}
-- ASN1STOP
```

TABLE 2

| SCPTMConfiguration field descriptions |
| --- |
| sc-mich-InfoList<br>Provides the configuration of each SC-MTCH in the current cell.<br>scptm-NeighbourCellList<br>List of neighbour cells providing MBMS services via SC-MRB. When absent, the UE shall assume that MBMS services listed in the SCPTMConfiguration message are not provided via SC-MRB in any neighbour cell.<br>p-b<br>Parameter: $P_s$ for the PDSCH scrambled by G-RNTI. |

MBS related configuration provision: when gNB is configuring the UE with either master cell group (MCG) or secondary cell group (SCG), gNB should also provide the UE with on-going or supported MBS service configuration in each serving cell. So that UE can know which radio network temporary identity (RNTI) to monitor in each serving cell. The term "RNTI" used herein can refer to an identifier which can be included in signals between UE and a network device. The term "serving cell" used herein can refer to a cell which can provide services to the terminal device.

MBS service provided by one cell but transmitted in other cells: to leverage the advantage of carrier aggregation, gNB can use resources of a first cell to transmit MBS service data, thus UE might need to monitor a group RNTI (G-RNTI) in a whole cell group. Besides, with location-dependent content, the MBS service is for UEs in a second cell. Thus, UEs need understand the content received from the first cell is actually for the second cell.

Same MBS service provided in multiple cells: for a UE configured with multiple cells in a cell group, it can be the case that the same MBS service is provided in multiple cells (for example. SpCell(s) and/or SCell(s)). The UE needs decide to receive the MBS service data from one or multiple/all relevant cells upon if the MBS service content is a location-dependent.

Moreover, MBS traffic needs to be delivered from a single data source (for example, Application Service Provider) to multiple UEs. Depending on many factors, multiple delivery methods may be used to deliver MBS traffic in the 5G. The term "unicast delivery" refers to a mechanism by which application data and signaling between UE and the application server are delivered using protocol data unit (PDU) session within the 3GPP network and using individual UE and application server addresses (e.g. IP addresses) between the 3GPP network and the application server.

From the view point of 5G CN, two delivery approaches are possible for MBS multicast service:

(1) 5GC individual MBS traffic delivery approach: 5G CN receives a single copy of MBS data packets and delivers separate copies of those MBS data packets to individual UEs via per-U E PDU sessions, hence for each such UE one PDU session is required to be associated with a multicast session. For example, as shown in FIG. 1, the 5G CN 120 can receive the single copy of MBS data packets and deliver separate copies of those MBS data packets to UE 110-3 and UE 110-4 individually via per PDU secession.

(2) 5GC Shared MBS traffic delivery approach: 5G CN receives a single copy of MBS data packets and delivers a single copy of those MBS packets packet to a RAN node, which then delivers them to one or multiple UEs. For example, as shown in FIG. 1, the 5G CN 120 can receive the single copy of MBS data packets and deliver the single copy of those MBS packets to the 5G RAN node 130 which then can deliver the single copy to one or more UEs, for example, UE 110-1 and UE 110-2.

If 5GC Individual MBS traffic delivery approach is supported, a same received single copy of MBS data packets by the CN may be delivered via both 5GC Individual MBS traffic delivery approach for some UE(s) and 5GC Shared MBS traffic delivery approach for other UEs.

From the viewpoint of RAN, in a case of the shared delivery, two delivery approaches are available for the transmission of MBS packet flows over radio. A RAN node may use a combination of PTP/PTM to deliver an MBS packet to UEs.

- Point-to-Point (PTP) delivery approach: a RAN node delivers separate copies of MBS data packet over radio to individual UE. For example, the 5G RAN node 130 can deliver a copy of MBS data packets to UE 110-1 and deliver another copy of MBS data packets to UE 110-2.
- Point-to-Multipoint (PTM) delivery approach: a RAN node delivers a single copy of MBS data packets over radio to a set of UEs. For example, the 5G RAN node 130 can deliver a single copy of MBS data packets to UE 110-1 and UE 110-2.

In order to increase data rate per user, carrier aggregation (CA) is proposed. In CA, multiple frequency blocks (called component carriers (CC)) can be assigned to the same user. The maximum possible data rate per user is increased the more frequency blocks are assigned to a user. A UE can simultaneously receive or transmit on one or multiple CCs depending on its capabilities:

- A UE with single timing advance capability for CA can simultaneously receive or transmit on multiple CCs corresponding to multiple serving cells sharing the same timing advance;
- A UE with multiple timing advance capability for CA can simultaneously receive and/or transmit on multiple CCs corresponding to multiple serving cells with different timing advances;
- A non-CA capable UE can receive on a single CC and transmit on a single CC corresponding to one serving cell only.

CA can be supported for both contiguous and non-contiguous CCs. When CA is deployed, frame timing and system frame number (SFN) are aligned across cells that can be aggregated, or a UE can be configured with an offset in multiple slots between the PCell/PSCell and an SCell. The maximum number of configured CCs for a UE is 16 for DL and 16 for UL.

In the case of CA, multi-carrier nature of a physical layer can be only exposed to the MAC layer for which one hybrid automatic repeat request (HARQ) entity can be required per serving cell below:

- In both uplink and downlink, there is one independent hybrid-ARQ entity per serving cell and one transport block is generated per assignment or grant per serving cell in the absence of spatial multiplexing. Each transport block and its potential HARQ retransmissions are mapped to a single serving cell.

When CA is configured, UE only has one RRC connection with the network. At RRC connection establishment or re-establishment, one serving cell can provide the NAS mobility information, and at RRC connection re-establishment or handover, one serving cell can provide the security input. This cell is referred to as the Primary Cell (PCell). Depending on UE capabilities, Secondary Cells (SCells) can be configured to form together with the PCell a set of serving cells. The configured set of serving cells for a UE therefore always can comprise one PCell and one or more SCells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signaling is used for sending all required system information of the SCell i.e. while in connected mode, UEs need not acquire broadcast system information directly from the SCells.

Therefore, new solutions on MBS are needed. According to embodiments of the present disclosure, a terminal device distinguishes different content provide in different cells based on a MBS configuration received from a network device. The terminal device monitors an identifier in one or more cells and receives one or more data packets of the MBS service from the one or more cells. In this way, the MBS service can be more flexible and data reliability is also improved.

Example Communication System and Networks

Figure 2:
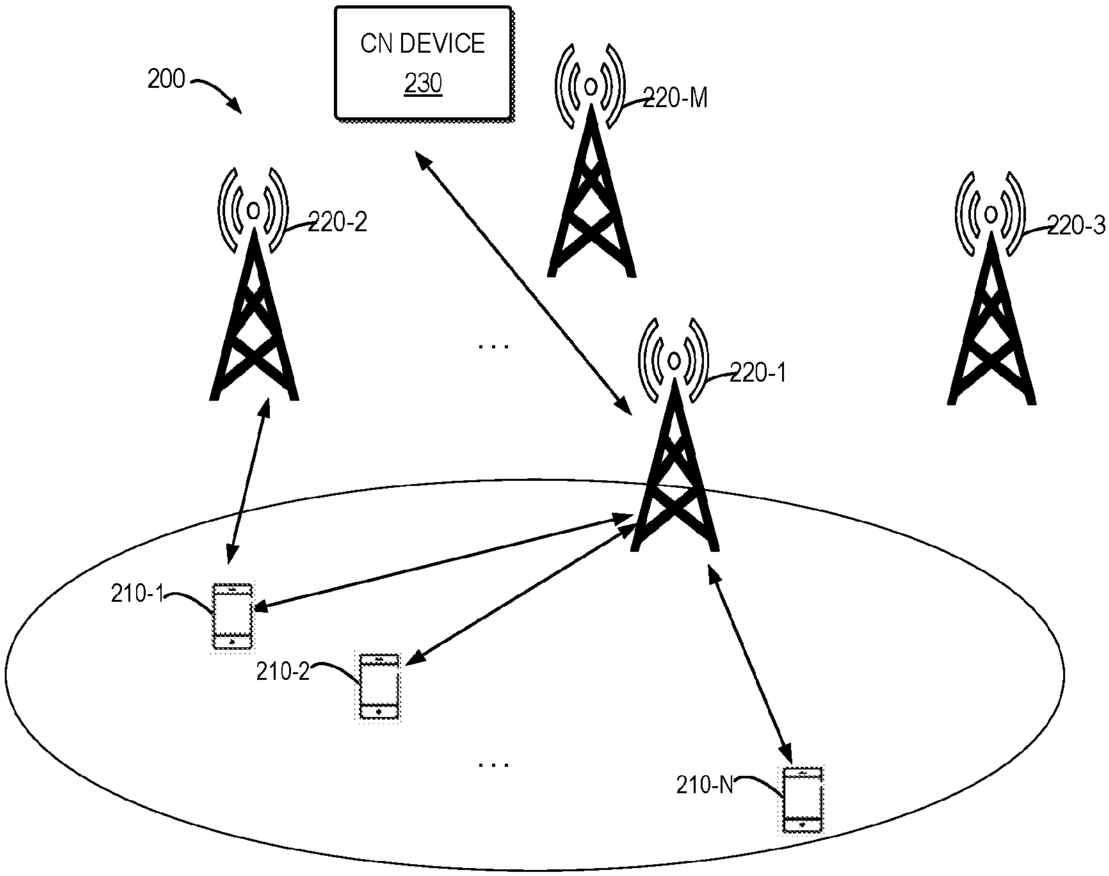
FIG. 2 illustrates a schematic diagram of a communication system in accordance with an exemplary embodiment.

FIG. 2 illustrates a schematic diagram of a communication system 200 in which embodiments of the present disclosure can be implemented. The communication system 200, which is a part of a communication network, comprises a terminal device 210-1, a terminal device 210-2, . . . , a terminal device 210-N, which can be collectively referred to as "terminal device(s) 210." The number N can be any suitable integer number.

The communication system 200 further comprises a communication device 220-1, a communication device 220-2, a communication device 220-3, . . . , a communication device 220-M, which can be collectively referred to as "communication device(s) 220." The number M can be any suitable integer number. In some embodiments, the communication devices 220 may be network devices. The communication system also comprises a core network device 230. Only as an example, the core network device 230 may be an Access and Mobility Management Function (AMF) entity. In the communication system 200, the communication devices 220 and the terminal devices 210 can communicate data and control information to each other. The numbers of devices shown in FIG. 2 are given for the purpose of illustration without suggesting any limitations.

Communications in the communication system 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Embodiments of the present disclosure can be applied to any suitable scenarios. For example, embodiments of the present disclosure can be implemented at reduced capability NR devices. Alternatively, embodiments of the present disclosure can be implemented in one of the followings: NR multiple-input and multiple-output (MIMO), NR sidelink enhancements, NR systems with frequency above 52.6 GHz, an extending NR operation up to 71 GHz, narrow band-Internet of Thing (NB-IOT)/enhanced Machine Type Communication (eMTC) over non-terrestrial networks (NTN), NTN. UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

Example Processes

Figure 3:
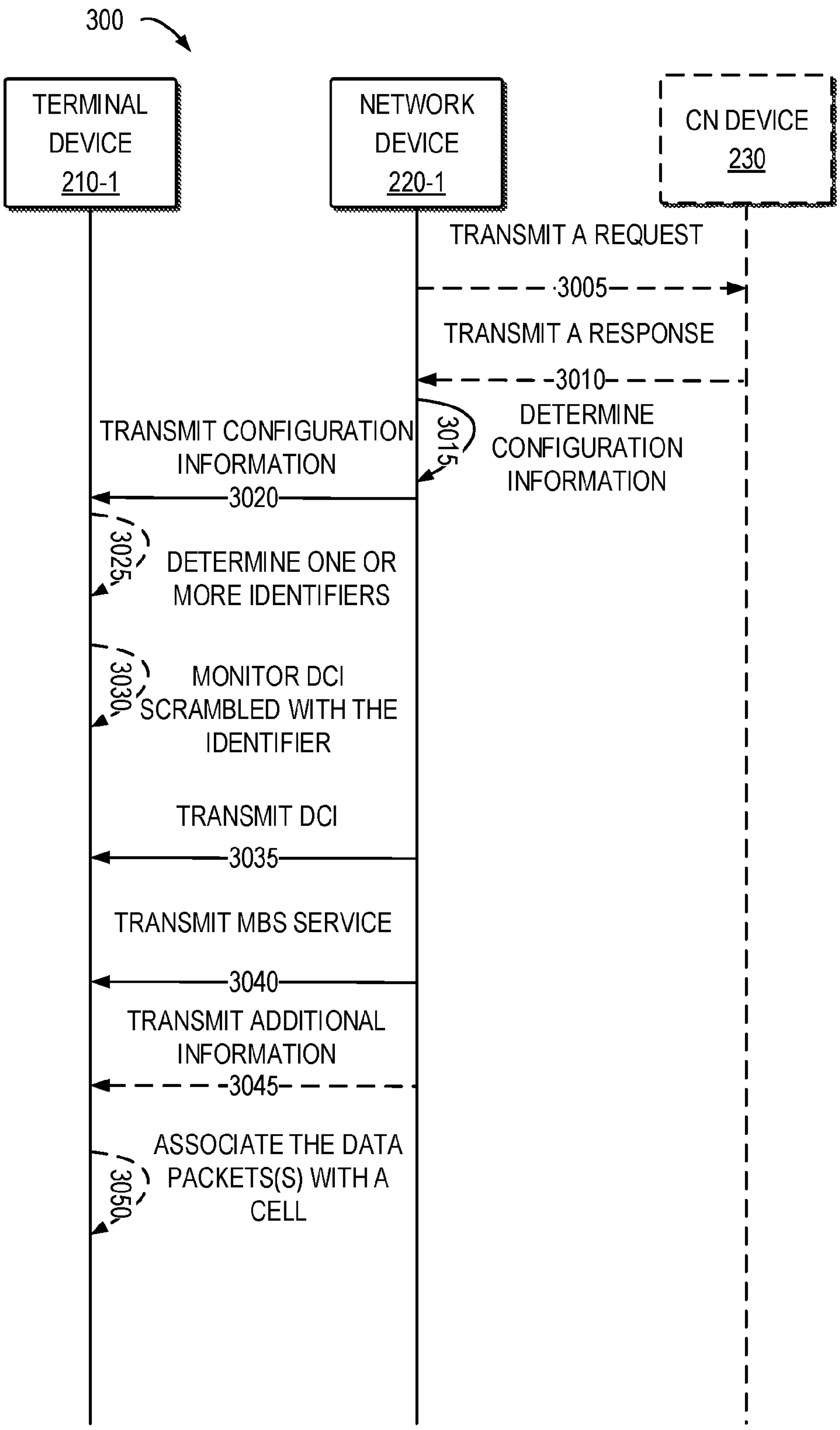
FIG. 3 illustrates a signaling chart illustrating an example process in accordance with an exemplary embodiment.

Some example processes in accordance with embodiments of the present disclosure will be described in detail below. Reference is now made to FIG. 3. FIG. 3 illustrates a signaling chart demonstrating an example process 300 according to some embodiments of the present disclosure. For the purpose of this discussion, the process 300 will be described with reference to FIG. 2. Only for the purpose of illustrations, the process 300 can involve the terminal device 210-1 and the network device 220-1 as illustrated in FIG. 2. In some embodiments, the example process 300 can be applied to the scenario of CA. Alternatively, the example process 300 can also be applied to other communication scenarios.

In some embodiments, if a terminal device (for example, the terminal device 210-1) initially accesses to the network, an identity of the terminal device may be reported to the CN device 230. Alternatively, if the terminal device is subscribed in the 5GC, the identity of the terminal device can be reported to the CN device 230. If the identity of the terminal device is subscribed, the CN device 230 can transmit the identity of the terminal device to the network devices (for example, the network device 220-1). The identity of the terminal device can be transmitted in any suitable messages. For example, the identity of the terminal device can be included in a context setup message which is transmitted from the CN device 130 to the network device 220-1. The context setup message may also comprise an indication of the service. In addition, the context setup message may comprise a range of a transmission area of the MBS service. In other embodiments, a temporary mobile group identity (TMGI) which can identify the MBS service can also be included in the context setup message. Alternatively or in addition, the context setup message can comprise a session identity of the service. It should be noted that the context setup message may comprise any suitable parameters. In this way, the communication device knows that the terminal device requires the MBS service surrounding it and the serving area or the range of transmission area of the MBS service for the MBS service.

In some embodiments, the network device 220-1 can transmit 3005 a request for a configuration related to a MBS service to the CN device 230. The request can be transmitted via a proper signaling between the network device 220-1 and the CN device 230. For example, the MBS service can be a stream media service. Alternatively, the MBS service can be a service related to internet of vehicles. It should be noted that the MBS service can be any suitable types of services. The CN device 230 can transmit 3010 a response to the request to the network device 220-1. The response can comprise the configuration of the MBS service which will be described in detailed later. In other embodiments, the CN device 230 can transmit the configuration of the MBS service to the network device 220-1 without receiving such request from the network device 220-1. The configuration of the MBS can be transmitted via any proper signaling between the network device 220-1 and the CN device 230.

Figure 4:
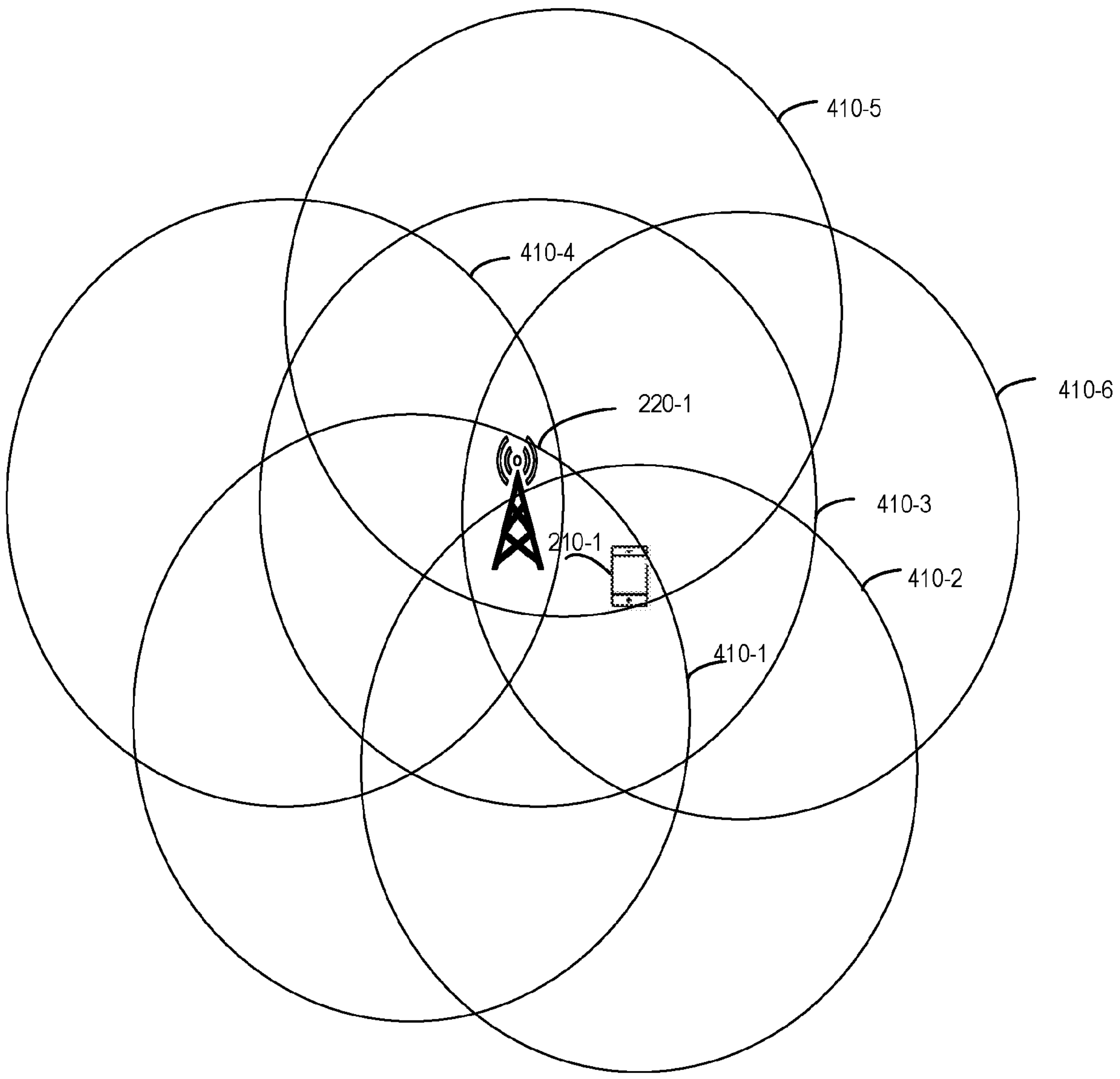
FIG. 4 illustrates a schematic diagram of a carrier aggregation system in accordance with an exemplary embodiment.

The network device 220-1 determines 3015 configuration information relating to the MBS service. The configuration information of the MBS service indicates one or more serving cells for providing the MBS service. In some embodiments the configuration information of the MBS service can indicate a set of serving cells. The size of the set of serving cells can be any suitable size. For example, the set of serving cells can comprise one serving cell. For example, the set of serving cells can comprise one serving cell. Alternatively, the set of serving cells can comprise more than one serving cell. Only as an example, as shown in FIG. 4, the set of serving cells can comprise the cell 410-1. Alternatively, the set of serving cells can comprise one or more of: cells 410-1, 410-2, 410-3, 4104, 410-5 and 410-6 which can provide the MBS service. For example, in a scenario of CA, as shown in FIG. 4, the terminal device 210-1 is in an overlapped coverage of cells 410-1, 410-2, 410-3 and 410-5. In this situation, the terminal device 210-1 can receive the MBS service from these cells 410-1, 410-2, 410-3 and 410-5. It should be noted that the number of cells shown in FIG. 4 is only an example not limitation.

In some embodiments, the configuration information can comprise MBS session information. The term "MBS session" used herein refers to a duration that the data associated with the MBS service can be transmitted to the terminal device. For example, the MBS session information can comprise a range of transmission area of the MBS service. Only as an example, the MBS session information can comprise a temporary multicast group identity (TMGI) of the MBS service which can indicate the range of transmission area of the MBS service. In addition, the MBS session information can comprise an identity of the MBS session.

Alternatively or in addition, the configuration information of the MBS service can comprise an indication regarding whether the MBS service is location dependent. In some embodiments, content of the MBS service can vary with different locations in the range of transmission area of the MBS service. In this situation, the indication can indicate that the MBS service is location dependent. Alternatively, if the content of the MBS service can be same at different locations in the range of transmission area of the MBS service, the indication can indicate that the MBS service is not location dependent. In this situation, the configuration information can comprise one or more area identities associated with the MBS service. For example, if the MBS service is location dependent, the area identities of different locations can be different.

In other embodiments, the configuration information of the MBS service can comprise indexed for distinguishing different contents of the MBS service in different serving cells in the set of serving cells. For example, a plurality of serving cells can provide the MBS service but transmit different contents of the MBS service to the terminal device 210-1. In this situation, the terminal device 210-1 can distinguish those different contents based on the indexes. In some embodiments, the indexes can be any suitable number. Only as an example, if the cells 410-1, 410-2 and 410-3 can provide the MBS service, the configuration information can indicate that index "0" represents a portion of the content of the MBS service received in the cell 410-1, index "1" represents a portion of the content of the MBS service received in the cell 410-2, or index "2" represents a portion of the content of the MBS service received in the cell 410-3.

Alternatively or in addition, the configuration information of the MBS service can comprise an identifier associated with the MBS service. The term "identifier" used herein refers to information can which can be included in signals between UE and a network device. In some embodiments, the identifier can be a physical layer identifier. For example, the identifier can be a G-RNTI. It should be noted that the identifier can be any suitable type of identifiers.

In other embodiments, the configuration information can comprise a list of allowed serving cells for the MBS service. For example, cells in the list of allowed serving cells can transmit same content of the MBS service.

In some embodiments, the configuration information can comprise an indication regarding whether the MBS service is transmitted on one serving cell or a plurality of serving cells in the set of serving cells. For example, if the MBS service is only transmitted on the cell 410-1, the configuration information can comprise the indication which indicates that the MBS service is transmitted on the cell 410-1. Alternatively, if the MBS service is transmitted on the set of serving cells, the configuration information can comprise the indication which indicates that the MBS service is transmitted on the entire set of serving cells.

Alternatively or in addition, the configuration information can comprise multimedia broadcast multicast service (MBMS) traffic channel (MTCH) scheduling information. The term "MTCH scheduling information" used herein can refer to information for scheduling the MBMS traffic on the MTCH channel. For example, the MTCH scheduling information can comprise a discontinuous reception (DRX) configuration associated with the MBS service for the terminal device 210-1. Only as an example, the DRX configuration can indicate an on-duration of the DRX. In addition, the DRX configuration can indicate an off-duration of the DRX. Further, the DRX configuration can also indicate the DRX cycle. The term "DRX" used herein refers to a technique that allows a UE to turn off its transceiver for a duration of a DRX cycle when there are no packets to be received. The term "on-duration" used herein refers to a time period during which the terminal device is able to monitor a downlink channel and receive data or control information on the downlink channel. The term "off-duration" used herein refers to a time period during which the terminal device does not monitor the downlink channel and does not receive data or control information on the downlink channel. The term "DRX cycle" used herein comprises an on-duration during which the terminal device should monitor the downlink channel and a DRX period during which the terminal device can skip reception of downlink channels.

The network device 220-1 transmits 3020 the configuration information to the terminal device 210-1. In some embodiments, the configuration information for the MBS service can be transmitted via a RRC signaling. Alternatively, the configuration information for the MBS service can be transmitted in a system information block. In some embodiments, if the terminal device 210-1 is configured with a master cell group or a secondary cell group, the configuration information for the MBS service can be transmitted with the same signaling for configuration the master cell group or a secondary cell group. The term "master cell group (MCG)" used herein can refer to a group of serving cells associated with a master node. The term "secondary cell group (SCG)" used herein can refer to a group of serving cells associated with a secondary node. In other embodiments, the configuration the configuration information for the MBS service can be transmitted separately from configuration the master cell group or a secondary cell group.

Only as an example, the configuration information for the MBS service can be comprised in RRCReconfiguration message. In some embodiments, information element "MBS configuration" can be included in the information elements "SpCellConfig" and "SCellConfig" in the RRCReconfiguration message. The term "information element" used herein refer to a type-length-value item, containing 1) a type (which corresponds to the label of a field), a length indicator, and a value, although any combination of one or more of those parts is possible. Generally, a message can comprise one or more information elements. The "SpCellConfig" used herein refers to a configuration for the primary cell of a master or secondary cell group. The "SCellConfig" used herein refers to a configuration for the secondary cell of a master or secondary cell group. Only as an example, the RRCReconfiguration message can comprise the following information elements: masterCellGroup/MRDC-SecondaryCellGroupConfig→SpCellConfig/SCellConfig→MBS configuration.

In other embodiments, an information element "MBS configuration" can be included in an information element "DRB-ToAddMod" the RRCReconfiguration message. Only as an example, the RRCReconfiguration message can comprise the following information elements: RadioBearerConfig→DRB-ToAddMod. The information element "DRB-ToAddMod" (used herein refers to configuration for the data radio bearer to be added or modified.

Alternatively or in addition, an information element "MBS configuration" can be included in an information element "LogicalChannelConfig" in RRCReconfigurationmessage. Only as an example, the RRCReconfiguration message can comprise the following information elements: CellGroupConfig→RLC-BearerConfig→LogicalChannelConfig. The term "LogicalChannelConfig" used herein refers to a configuration for the logical channel.

Table 3 shows an example of a MBS configuration where the MBS configuration can be included in SpCellConfig and SCellConfig.

TABLE 3

```
CellGroupConfig ::=                        SEQUENCE {
  spCellConfig                                          SpCellConfig
OPTIONAL,   -- Need M
  sCellToAddModList                                     SEQUENCE (SIZE
(1..maxNrofSCells)) OF SCellConfig         OPTIONAL,   -- Need N
  sCellToReleaseList                       SEQUENCE (SIZE (1..maxNrofSCells))
OF SCellIndex                              OPTIONAL,   -- Need N
  ...,
}
SpCellConfig :=                            SEQUENCE {
servCellIndex                                           ServCellIndex
OPTIONAL,   -- Cond SCG
mBSConfiguration                           MBSConfiguration
```

TABLE 3-continued

```
OPTIONAL,
  reconfigurationWithSync                          ReconfigurationWithSync
OPTIONAL,   -- Cond ReconfWithSync
  rlf-TimersAndConstants                    SetupRelease   {   RLF-TimersAndConstants   }
OPTIONAL,   -- Need M.
  rlmInSyncOutOfSyncThreshold                      ENUMERATED   {n1}
OPTIONAL,   -- Need S
  spCellConfigDedicated                               ServingCellConfig
OPTIONAL,   -- Need M
  ...
}
SCellConfig ::=                        SEQUENCE {
sCellIndex                               SCellIndex,
mBSConfiguration                         MBSConfiguration
OPTIONAL,
  sCellConfigCommon                              ServingCellConfigCommon
OPTIONAL,   -- Cond SCellAdd
  sCellConfigDedicated                                ServingCellConfig
OPTIONAL,   -- Cond SCellAddMod
  ...,
}
```

The terminal device 210-1 determines 3025 an identifiers associated with the MBS service. For example, the terminal device 210-1 can obtain the identifiers from the configuration information. In some embodiments, if the identifier associated with the MBS service can be the same in the set of serving cells, the terminal device 210-1 can obtain the identifier from the configuration information. Alternatively, if the identifiers associated with the MBS service can be different in the set of serving cells, the terminal device 210-1 can obtain a plurality of identifiers from the configuration information.

The terminal device 210-1 can monitor 3030 downlink control information (DCI) associated with the identifier in at least one serving cell in the set of serving cells. The term "downlink control information (DCI)" used herein refers to information that provide UE with the necessary information such as physical layer resource allocation, power control commands, HARQ information for both uplink and downlink. There are various DCI formats which are predefined formats in which the downlink control information are packed or formed and transmitted in physical downlink control channel (PDCCH). In some embodiments, the DCI can be scrambled with the identifier. For example, cyclic redundancy check (CRC) bits in the DCI can be scrambled by the identifier. The term "scrambling" used herein refer to a digital encoding technique that can be used to identify and distinguish cells.

In some embodiments, if the configuration information is received from the network device 220-1 in the cell 410-1, the terminal device 210-1 can only monitor the DC associated with the identifier in the cell 410-1. In other words, the terminal device 210-1 can only monitor the DCI associated with the in the cell where the configuration information for the MBS service is provided. In this situation, the terminal device 210-1 can receive at least one data packet in this cell.

Alternatively, the terminal device 210-1 can determine whether to monitor the currently serving cell or a plurality of serving cells in the set of serving cells based on the configuration information for the MBS service. In some embodiments, the configuration information can comprise an indication regarding whether the MBS service is transmitted on one cell. In this situation, the terminal device 210-1 can monitor the DCI associated with the identifier in that cell. For example, if the indication is "1", it represents that the MBS service is transmitted on one cell. If the indication is "0", it represents that MBS service is transmitted on more than one cell. It should be noted that the indication can be any suitable proper forms. Only as an example, if the configuration information for the MBS service indicates the cell 410-1 needs to be monitored, the terminal device 210-1 can monitor the DCI associated with the identifier in the cell 410-1. Alternatively, the configuration information can comprise an indication which indicates a plurality of serving cells from the one or more serving cells on which the MBS service is transmitted. In this situation, the terminal device 210-1 can monitor the DCI associated with the identifier in the plurality of serving cells. For example, if the configuration information for the MBS service indicates the cell 410-1 and the cell 410-2 need to be monitored, the terminal device 210-1 can monitor the DCI associated with the identifier in the cells 410-1 and 410-2. In other embodiments, if the configuration information for the MBS service indicates that all cells in the set of serving cells need to be monitored, the terminal device 210-1 can monitor the DCI associated with the identifier in all cells in the set of serving cells. In this situation, the terminal device 210-1 can receive at least one data packet in all cells in the set of serving cells.

In other embodiments, the configuration information for the MBS service can indicate a list of allowed cells for the MBS service. In this situation, the terminal device 210-1 can understand that the MBS service can be provided by cells in the list of allowed cells and can monitor the DCI associated with the identifier in cells of the list of allowed cells.

In some embodiments, the network device 220-1 can indicate the terminal device 210-1 only to monitor the DCI associated with the identifier in a target serving cell for the sake of power saving. For example, the configuration information for the MBS service can comprise one-bit field to indicate the target serving cell. In this situation, the terminal device 210-1 can monitor the DCI associated with the identifier in target serving cell indicated in the configuration information. In this situation, the terminal device 210-1 can receive at least one data packet in the target serving cell. Only as an example, the configuration information may indicate the cell 410-3. The terminal device 210-1 can determine monitor the DCI associated with the identifier in the cell 410-3.

In other embodiments, the network device 220-1 can transmit a search space configuration. The term "search space configuration" used herein refers information that indicates where to monitor for scheduling assignments/ grants relating to a certain component carrier. In some embodiments, the search space configuration can also comprise DCI format. The DCI associated with the at least one identifier can be regarded as a type of DCI format. The term "DCI format" used herein refers to a predefined format in which the downlink control information is packed/formed and transmitted in PDCCH. In this case, the search space configuration for a target serving cell can indicate such type of DCI format where the DCI associated with the at least one identifier. In this situation, the terminal device 210-1 can monitor the DCI associated with the at least one identifier in the target serving cell. In this situation, the terminal device 210-1 can receive at least one data packet in the target serving cell.

In some embodiments, the network device 220-1 can transmit 3035 the DCI associated with the identifier to the terminal device 210-1. For example, the network device 220-1 can transmit the DCI on the PDCCH. In some embodiments, the DCI can be transmitted in the currently serving cell. Alternatively, the DCI can be transmitted in one or more cells in the set of serving cells which can provide the MBS service. In other embodiments, the network device 220-1 can transmit 3040 the MBS service to the terminal device 210-1. For example, the network device 220-1 can transmit one or more data packets associated with the MBS service.

In some embodiments, the network device 220-1 can transmit 3045 additional information to the terminal device 210-1. The additional information used herein refers to information can be used to distinguish different content for the MBS service in different serving cells. In some embodiments, the additional information can be an index to distinguish different content for the MBS service. For example, contents of the MBS service in cells with different index are different. In some embodiments, the additional information can be determined by the network device 220-1. Alternatively, the additional information can be determined by the CN device 230. In some embodiments, the terminal device 210-1 can associate 3050 the at least one data packet with a target cell based on the additional information.

In other embodiments, if the MBS service is location-dependent, the additional information can comprise an identity of an area in which certain content of the MBS service can be valid. For example, the additional information can indicate one or more validity areas for the MBS service. In this situation, the terminal device 210-1 can understand that content of the MBS service is valid in the one or more validity areas.

In some embodiments, the additional information can be transmitted via a physical layer signaling. For instance, when the network device 220-1 transmits a data packet of the MBS service in the downlink, the additional information can be added in associated DCI for the data packet to indicate the associated cell or area of this data packet. In this situation, the additional information can be an area identity associate with the data packet. The term "area identity" used herein refers to an identity that can be used to identify the area. Alternatively, the additional information can comprise another identifier associate with the MBS service. Alternatively, the additional information can be a cell identity associate with the data packet. The term "cell identity" used herein refer to an identity that can be used to identify the cell. In other embodiments, the associated DCI for the data packet can be associated with the area identity and the terminal device 210-1 can determine the corresponding area after decoding the associated DCI for the data packet. Only as an example, if the cell identity in the additional information can be the identity of the cell 410-5 and the at least one data packet is received in the cell 410-1, the terminal device 210-1 can associate the at least one data packet with the cell 410-5.

In some embodiments, the additional information can be transmitted via a MAC layer header. For example, the additional information can be provided in MAC layer logical channel identifier (LCID). In this situation, in some embodiment, the LCID can be used to indicate a cell or area associated with the at least one data packet. In other embodiments, the additional information can be included in a MAC control element (MAC CE). In this situation, in some embodiment, the MAC CE can comprise information of the cell or area associated with the at least one data packet. Only as an example, if the cell in the LCID or MAC CE can be cell 410-5 and the at least one data packet is received in the cell 410-1, the terminal device 210-1 can associate the at least one data packet with the cell 410-5.

In other embodiments, the MBS service can be provided in multiple serving cells (for example, cells 410-1, 410-2 and 410-3) and the MBS service can be associated with different identifier s in the multiple cells. If the configuration information for the MBS service indicates that contents of the MBS service provided in multiple cells are different, the terminal device 210-1 can monitor DCI associated with all identifiers indicated in the configuration information for the MBS service in the multiple serving cells (for example, in cells 410-1, 410-2 and 410-3). Alternatively, if the configuration information for the MBS service indicates that contents of the MBS service provided in multiple serving cells are the same, the terminal device 210-1 can determine a target cell from the multiple serving cells. The terminal device 210-1 can determine a target identifier corresponding to the target cell based on the configuration information. In this situation, the terminal device 210-1 can monitor the DCI associated with the target identifier in the target serving cell and receive the MBS service in the target serving cell. For example, the terminal device 210-1 can determine the cell 410-3 as the target cell and determine an identifier according to the cell 410-3. In this case, the terminal 210-1 can monitor the DCI scrambled with such identifier and receive the MBS service in the cell 410-3. In some embodiments, the terminal device 210-1 can randomly select the target cell from the plurality of serving cells. Alternatively, the terminal device 210-1 can select the target cell with link quality exceeding a threshold quality. For example, the terminal device 210-1 can measure link quality of the plurality cells and select the target cell based on the measurement result. In some embodiments, the link quality can be measured based on power of signals received in the plurality of serving cells.

In other embodiments, the terminal device 210-1 can also determine another target cell from the multiple serving cells. In this situation, the terminal device 210-1 can determine another target identifier corresponding to the other target serving cell. In this case, the terminal device 210-1 can monitor the DCI associated with the other target identifiers corresponding in the other target serving cell and receive the at least one data packet in the other target serving cell. In some embodiments, the target cell can be determined randomly. Alternatively, the target cell can be determined based on a link quality in the target cell. In some embodiments, the terminal device 210-1 can randomly select the other target cell from the plurality of serving cells. Alternatively, the terminal device 210-1 can select the other target cell with link quality exceeding a threshold quality. For example, the terminal device 210-1 can measure link quality of the plurality cells and select the other target cell based on the measurement result. In some embodiments, the link quality can be measured based on power of signals received in the plurality of serving cells.

According to embodiments of the present disclosure, solutions are proposed to facilitate MBS service transmission in different cells within the same cell group. It can configure the MBS service more flexible. Further, data rate for the MBS service can also be improved.

Example Method

Figure 5:
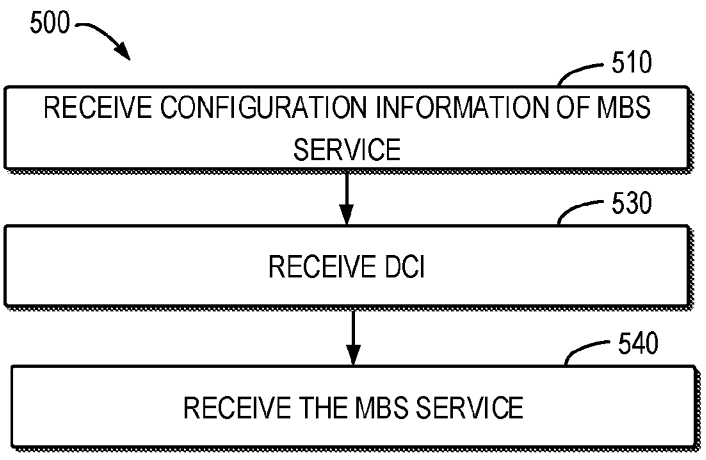
FIG. 5 illustrates a flowchart of an example method in accordance with an exemplary embodiment.

FIG. 5 illustrates a flowchart of an example method 500 according to some embodiments of the present disclosure. The method 500 can be performed by the terminal device 210-1 as shown in FIG. 2. It is to be understood that the method 500 can include additional blocks not shown and/or can omit some blocks as shown, and the scope of the present disclosure is not limited in this regard. For the purpose of discussion, the method 500 will be described from the perspective of the terminal device 210-1 with reference to FIG. 2.

At block 510, the terminal device 210-1 receives configuration information from the network device 220-1. The configuration information relates to the MBS service provided in one or more serving cells. The configuration information of the MBS service indicates a set of serving cells for providing the MBS service. The size of the set of serving cells can be any suitable size. For example, the set of serving cells can comprise one serving cell. Alternatively, the set of serving cells can comprise more than one serving cell.

In some embodiments, the configuration information can comprise MBS session information. The term "MBS session" used herein refers to a duration that the data associated with the MBS service can be transmitted to the terminal device. For example, the MBS session information can comprise a range of transmission area of the MBS service. Only as an example, the MBS session information can comprise a temporary multicast group identity (TMGI) of the MBS service which can indicate the range of transmission area of the MBS service. In addition, the MBS session information can comprise an identity of the MBS session.

Alternatively or in addition, the configuration information of the MBS service can comprise an indication regarding whether the MBS service is location dependent. In some embodiments, content of the MBS service can vary with different locations in the range of transmission area of the MBS service. In this situation, the indication can indicate that the MBS service is location dependent. Alternatively, if the content of the MBS service can be same at different locations in the range of transmission area of the MBS service, the indication can indicate that the MBS service is not location dependent. In this situation, the configuration information can comprise one or more area identities associated with the MBS service. For example, if the MBS service is location dependent, the area identities of different locations can be different.

In other embodiments, the configuration information of the MBS service can comprise indexed for distinguishing different contents of the MBS service in different serving cells in the set of serving cells. For example, a plurality of serving cells can provide the MBS service but transmit different contents of the MBS service to the terminal device 210-1. In this situation, the terminal device 210-1 can distinguish those different contents based on the indexes. In some embodiments, the indexes can be any suitable number. Only as an example, if the cells 410-1, 410-2 and 410-3 can provide the MBS service, the configuration information can indicate that index "0" represents a portion of the content of the MBS service received in the cell 410-1, index "1" represents a portion of the content of the MBS service received in the cell 410-2, or index "2" represents a portion of the content of the MBS service received in the cell 410-3.

Alternatively or in addition, the configuration information of the MBS service can comprise an identifier associated with the MBS service. In some embodiments, the identifier can be a physical layer identifier. For example, the identifier can be a G-RNTI. It should be noted that the identifier can be any suitable type of identifiers.

In other embodiments, the configuration information can comprise a list of allowed serving cells for the MBS service. For example, cells in the list of allowed serving cells can transmit same content of the MBS service.

In some embodiments, the configuration information can comprise an indication regarding whether the MBS service is transmitted on one serving cell or a plurality of serving cells in the set of serving cells. For example, if the MBS service is only transmitted on the cell 410-1, the configuration information can comprise the indication which indicates that the MBS service is transmitted on the cell 410-1. Alternatively, if the MBS service is transmitted on the set of serving cells, the configuration information can comprise the indication which indicates that the MBS service is transmitted on the entire set of serving cells.

Alternatively or in addition, the configuration information can comprise multimedia broadcast multicast service (MBMS) traffic channel (MTCH) scheduling information. The term "MTCH scheduling information" used herein can refer to information for scheduling the MBMS traffic on the MTCH channel. For example, the MTCH scheduling information can comprise a discontinuous reception (DRX) configuration associated with the MBS service for the terminal device 210-1. Only as an example, the DRX configuration can indicate an on-duration of the DRX. In addition, the DRX configuration can indicate an off-duration of the DRX. Further, the DRX configuration can also indicate the DRX cycle. The term "DRX" used herein refers to a technique that allows a UE to turn off its transceiver for a duration of a DRX cycle when there are no packets to be received. The term "on-duration" used herein refers to a time period during which the terminal device is able to monitor a downlink channel and receive data or control information on the downlink channel. The term "off-duration" used herein refers to a time period during which the terminal device does not monitor the downlink channel and does not receive data or control information on the downlink channel. The term "DRX cycle" used herein comprises an on-duration during which the terminal device should monitor the downlink channel and a DRX period during which the terminal device can skip reception of downlink channels.

In some embodiments, the configuration information for the MBS service can be transmitted via a RRC signaling. Alternatively, the configuration information for the MBS service can be transmitted in a system information block. In some embodiments, if the terminal device 210-1 is configured with a master cell group or a secondary cell group, the configuration information for the MBS service can be transmitted with the same signaling for configuration the master cell group or a secondary cell group. The term "master cell group (MCG)" used herein can refer to a group of serving cells associated with a master node. The term "secondary cell group (SCG)" used herein can refer to a group of serving cells associated with a secondary node. In other embodiments, the configuration the configuration information for the MBS service can be transmitted separately from configuration the master cell group or a secondary cell group.

Only as an example, the configuration information for the MBS service can be comprised in RRCReconfiguration message. In some embodiments, information element "MBS configuration" can be included in the information elements "SpCellConfig" and "SCellConfig" in the RRCReconfiguration message. The term "information element" used herein refer to a type-length-value item, containing 1) a type (which corresponds to the label of a field), a length indicator, and a value, although any combination of one or more of those parts is possible. Generally, a message can comprise one or more information elements. The "SpCellConfig" used herein refers to a configuration for the primary cell of a master or secondary cell group. The "SCellConfig" used herein refers to a configuration for the secondary cell of a master or secondary cell group. Only as an example, the RRCReconfiguration message can comprise the following information elements: masterCellGroup/MRDC-SecondaryCellGroupConfig→SpCellConfig/SCellConfig→MBS configuration.

In other embodiments, an information element "MBS configuration" can be included in an information element "DRB-ToAddMod" the RRCReconfiguration message. Only as an example, the RRCReconfiguration message can comprise the following information elements: RadioBearerConfig→DRB-ToAddMod. The information element "DRB-ToAddMod" used herein refers to configuration for the data radio bearer to be added or modified.

Alternatively or in addition, an information element "MBS configuration" can be included in an information element "LogicalChannelConfig" in RRCReconfiguration message. Only as an example, the RRCReconfiguration message can comprise the following information elements: CellGroupConfig→RLC-BearerConfig→LogicalChannelConfig. The term "LogicalChannelConfig" used herein refers to a configuration for the logical channel.

In some embodiments, the terminal device 210-1 can determine an identifier associated with the MBS service. For example, the terminal device 210-1 can obtain the one or more identifiers from the configuration information. In some embodiments, the identifier associated with the MBS service can be the same in the set of serving cells. Alternatively, the identifiers associated with the MBS service can be different in the set of serving cells.

At block 530, the terminal device 210-1 receives downlink control information from the one or more serving cells in which the MBS service is provided. The terminal device 210-1 receives, at block 540, the MBS service form the one or more serving cells based on the downlink control information. In some embodiments, the terminal device 210-1 can monitor downlink control information (DCI) associated with the identifier in at least one serving cell in the set of serving cells.

In some embodiments, if the configuration information is received from the network device 220-1 in the cell 410-1, the terminal device 210-1 can only monitor the DCI associated with the identifier in the cell 410-1. In other words, the terminal device 210-1 can only monitor the DCI associated with the identifier in the cell where the configuration information for the MBS service is provided. In this situation, the terminal device 210-1 can receive at least one data packet in this cell.

Alternatively, the terminal device 210-1 can determine whether to monitor the currently serving cell or a plurality of serving cells in the set of serving cells based on the configuration information for the MBS service. For example, if the configuration information for the MBS service indicates the cell 410-1 needs to be monitored, the terminal device 210-1 can monitor the DCI associated with the identifier in the cell 410-1. Alternatively, if the configuration information for the MBS service indicates the cell 410-1 and the cell 410-2 need to be monitored, the terminal device 210-1 can monitor the DCI associated with the at least one identifier in the cells 410-1 and 410-2. In other embodiments, if the configuration information for the MBS service indicates that all cells in the set of serving cells need to be monitored, the terminal device 210-1 can monitor the DCI associated with the identifier in all cells in the set of serving cells. In this situation, the terminal device 210-1 can receive at least one data packet in all cells in the set of serving cells.

In other embodiments, the configuration information for the MBS service can indicate a list of allowed cells for the MBS service. In this situation, the terminal device 210-1 can understand that the MBS service can be provided by cells in the list of allowed cells and can monitor the DCI associated with the identifier in cells in the list of allowed cells.

In some embodiments, the network device 220-1 can indicate the terminal device 210-1 only to monitor the DCI associated with the identifier in a target serving cell for the sake of power saving. For example, the configuration information for the MBS service can comprise one-bit field to indicate the target serving cell. In this situation, the terminal device 210-1 can monitor the DCI associated with the identifier in target serving cell indicated in the configuration information. In this situation, the terminal device 210-1 can receive at least one data packet in the target serving cell.

In other embodiments, the network device 220-1 can transmit a search space configuration. The term "search space configuration" used herein refers information that indicates where to monitor for scheduling assignments/grants relating to a certain component carrier. In some embodiments, the search space configuration can also comprise DCI format. The DCI associated with the identifier can be regarded as a type of DCI format. In this case, the search space configuration for a target serving cell can indicate such type of DCI format where the DCI associated with the identifier. In this situation, the terminal device 210-1 can monitor the DCI associated with the identifier in the target serving cell. In this situation, the terminal device 210-1 can receive at least one data packet in the target serving cell.

In some embodiments, additional information can be transmitted to the terminal device 210-1. The additional information used herein refer to information can be used to distinguish different content for the MBS service in different serving cells. In some embodiments, the additional information can be an index to distinguish different content for the MBS service. For example, contents of the MBS service in cells with different index are different. In some embodiments, the additional information can be determined by the network device 220-1. Alternatively, the additional information can be determined by the CN device 230. In some embodiments, the terminal device 210-1 can associate the at least one data packet with a target cell based on the additional information.

In other embodiments, if the MBS service is location-dependent, the additional information can comprise an identity of an area in which certain content of the MBS service can be valid. For example, the additional information can indicate one or more validity areas for the MBS service. In this situation, the terminal device 210-1 can understand that content of the MBS service is valid in the one or more validity areas.

In some embodiments, the additional information can be transmitted via a physical layer signaling. For instance, when the network device 220-1 transmits a data packet of the MBS service in the downlink, the additional information can be added in associated DCI for the data packet to indicate the associated cell or area of this data packet. In this situation, the additional information can be an area identity associate with the data packet. The term "area identity" used herein refer to an identity that can be used to identify the area. Alternatively, the additional information can comprise another identifier associate with the data packet. Alternatively, the additional information can be a cell identity associate with the data packet. The term "cell identity" used herein refer to an identity that can be used to identify the cell. In other embodiments, the associated DCI for the data packet can be associated with the area identity and the terminal device 210-1 can determine the corresponding area after decoding the associated DCI for the data packet. Only as an example, if the cell identity in the additional information can be the identity of the cell 410-5 and the at least one data packet is received in the cell 410-1, the terminal device 210-1 can associate the at least one data packet with the cell 410-5.

In some embodiments, the additional information can be transmitted via a MAC layer signaling. For example, the additional information can be provided in MAC layer logical channel identifier (LCID). In this situation, in some embodiment, the LCID can be used to indicate a cell or area associated with the at least one data packet. In other embodiments, the additional information can be included in a MAC control element (MAC CE). In this situation, in some embodiment, the MAC CE can comprise information of the cell or area associated with the at least one data packet. Only as an example, if the cell in the LCID or MAC CE can be cell 410-5 and the at least one data packet is received in the cell 410-1, the terminal device 210-1 can associate the at least one data packet with the cell 410-5.

In other embodiments, the MBS service can be provided in multiple serving cells and the MBS service can be associated with different identifiers in the multiple cells. If the configuration information for the MBS service indicates that contents of the MBS service provided in multiple cells are different, the terminal device 210-1 can monitor DCI associated with all identifiers indicated in the configuration information for the MBS service in the multiple serving cells (for example, in cells 410-1, 410-2 and 410-3). Alternatively, if the configuration information for the MBS service indicates that contents of the MBS service provided in multiple serving cells are the same, the terminal device 210-1 can determine a target cell from the multiple serving cells. In this situation, the terminal device 210-1 can monitor the DCI associated with a target identifier corresponding to the target serving cell and receive the at least one data packet in the target serving cell. In other embodiments, the terminal device 210-1 can also determine another target cell from the multiple serving cells. In this case, the terminal device 210-1 can monitor the DCI associated with another target identifier corresponding to the other target serving cell and receive the at least one data packet in the other target serving cell. In some embodiments, the target cell can be determined randomly. Alternatively, the target cell can be determined based on a link quality in the target cell.

Figure 6:
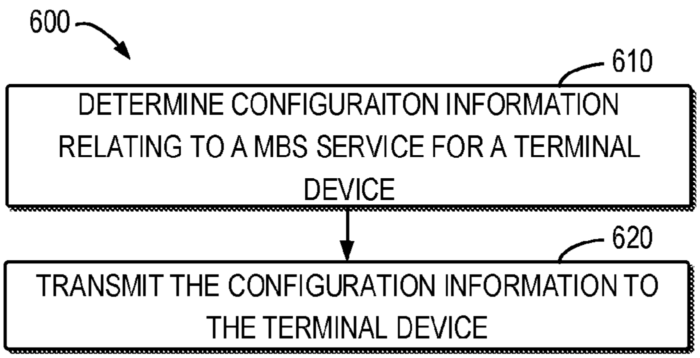
FIG. 6 illustrates a flowchart of an example method in accordance with an exemplary embodiment.

FIG. 6 illustrates a flowchart of an example method 600 according to some embodiments of the present disclosure. The method 600 can be performed by the network device 220-1 shown in FIG. 2. It is to be understood that the method 600 can include additional blocks not shown and/or can omit some blocks as shown, and the scope of the present disclosure is not limited in this regard. For the purpose of discussion, the method 600 will be described from the perspective of the network device 220-1 with reference to FIG. 2.

In some embodiments, if a terminal device (for example, the terminal device 210-1) initially accesses to the network, an identity of the terminal device may be reported to the CN device 230. Alternatively, if the terminal device is subscribed in the 5GC, the identity of the terminal device can be reported to the CN device 230. If the identity of the terminal device is subscribed, the CN device 230 can transmit the identity of the terminal device to the network devices (for example, the network device 220-1). The identity of the terminal device can be transmitted in any suitable messages. For example, the identity of the terminal device can be included in a context setup message which is transmitted from the CN device 130 to the network device 220-1. The context setup message may also comprise an indication of the service. In addition, the context setup message may comprise a range of transmission area of the MBS service. In other embodiments, a temporary multicast group identity (TMGI) of the service can also be included in the context setup message. Alternatively or in addition, the context setup message can comprise a session identity of the service. It should be noted that the context setup message may comprise any suitable parameters. In this way, the communication device knows that the terminal device requires the MBS service surrounding it and the range of transmission area of the MBS service.

In some embodiments, the network device 220-1 can transmit a request for a configuration of a MBS service to the CN device 230. The request can be transmitted via a proper signaling between the network device 220-1 and the CN device 230. For example, the MBS service can be a stream media service. Alternatively, the MBS service can be a service related to internet of vehicles. It should be noted that the MBS service can be any suitable types of services. The network device 220-1 can receive a response to the request from the CN device 230. The response can comprise the configuration of the MBS service which will be described in detailed later. In other embodiments, the CN device 230 can transmit the configuration of the MBS service to the network device 220-1 without receiving such request from the network device 220-1. The configuration of the MBS can be transmitted via any proper signaling between the network device 220-1 and the CN device 230.

At block 610, the network device 220-1 determines configuration information relating to the MBS service for the terminal device 210-1. The configuration information of the MBS service indicates a set of serving cells for providing the MBS service. The size of the set of serving cells can be any suitable size. For example, the set of serving cells can comprise one serving cell. Alternatively, the set of serving cells can comprise more than one serving cell.

In some embodiments, the configuration information can comprise MBS session information. The term "MBS session" used herein refers to a duration that the data associated with the MBS service can be transmitted to the terminal device. For example, the MBS session information can comprise a range of transmission area of the MBS service. Only as an example, the MBS session information can comprise a temporary multicast group identity (TMGI) of the MBS service which can indicate the range of transmission area of the MBS service. In addition, the MBS session information can comprise an identity of the MBS session.

Alternatively or in addition, the configuration information of the MBS service can comprise an indication regarding whether the MBS service is location dependent. In some embodiments, content of the MBS service can vary with different locations in the range of transmission area of the MBS service. In this situation, the indication can indicate that the MBS service is location dependent. Alternatively, if the content of the MBS service can be same at different locations in the range of transmission area of the MBS service, the indication can indicate that the MBS service is not location dependent. In this situation, the configuration information can comprise one or more area identities associated with the MBS service. For example, if the MBS service is location dependent, the area identities of different locations can be different.

In other embodiments, the configuration information of the MBS service can comprise indexed for distinguishing different contents of the MBS service in different serving cells in the set of serving cells. For example, a plurality of serving cells can provide the MBS service but transmit different contents of the MBS service to the terminal device 210-1. In this situation, the terminal device 210-1 can distinguish those different contents based on the indexes. In some embodiments, the indexes can be any suitable number.

Alternatively or in addition, the configuration information relating to the MBS service can comprise an identifier associated with the MBS service. In some embodiments, the identifier can be a physical layer identifier. For example, the identifier can be a G-RNTI. It should be noted that the identifier can be any suitable type of identifiers.

In other embodiments, the configuration information can comprise a list of allowed serving cells for the MBS service. For example, cells in the list of allowed serving cells can transmit same content of the MBS service.

In some embodiments, the configuration information can comprise an indication regarding whether the MBS service is transmitted on one serving cell or a plurality of serving cells in the set of serving cells. For example, if the MBS service is only transmitted on the cell 410-1, the configuration information can comprise the indication which indicates that the MBS service is transmitted on the cell 410-1. Alternatively, if the MBS service is transmitted on the set of serving cells, the configuration information can comprise the indication which indicates that the MBS service is transmitted on the entire set of serving cells.

Alternatively or in addition, the configuration information can comprise multimedia broadcast multicast service (MBMS) traffic channel (MTCH) scheduling information. The term "MTCH scheduling information" used herein can refer to information for scheduling the MBMS traffic on the MTCH channel. For example, the MTCH scheduling information can comprise a discontinuous reception (DRX) configuration associated with the MBS service for the terminal device 210-1. Only as an example, the DRX configuration can indicate an on-duration of the DRX. In addition, the DRX configuration can indicate an off-duration of the DRX. Further, the DRX configuration can also indicate the DRX cycle. The term "DRX" used herein refers to a technique that allows a UE to turn off its transceiver for a duration of a DRX cycle when there are no packets to be received. The term "on-duration" used herein refers to a time period during which the terminal device is able to monitor a downlink channel and receive data or control information on the downlink channel. The term "off-duration" used herein refers to a time period during which the terminal device does not monitor the downlink channel and does not receive data or control information on the downlink channel. The term "DRX cycle" used herein comprises an on-duration during which the terminal device should monitor the downlink channel and a DRX period during which the terminal device can skip reception of downlink channels.

At block 620, the network device 220-1 transmits the configuration information to the terminal device 210-1. In some embodiments, the configuration information for the MBS service can be transmitted via a RRC signaling. Alternatively, the configuration information for the MBS service can be transmitted in a system information block. In some embodiments, if the terminal device 210-1 is configured with a master cell group or a secondary cell group, the configuration information for the MBS service can be transmitted with the same signaling for configuration the master cell group or a secondary cell group. The term "master cell group (MCG)" used herein can refer to a group of serving cells associated with a master node. The term "secondary cell group (SCG)" used herein can refer to a group of serving cells associated with a secondary node. In other embodiments, the configuration the configuration information for the MBS service can be transmitted separately from configuration the master cell group or a secondary cell group.

Only as an example, the configuration information for the MBS service can be comprised in RRCReconfiguration message. In some embodiments, information element "MBS configuration" can be included in the information elements "SpCellConfig" and "SCellConfig" in the RRCReconfiguration message. The term "information element" used herein refer to a type-length-value item, containing 1) a type (which corresponds to the label of a field), a length indicator, and a value, although any combination of one or more of those parts is possible. Generally, a message can comprise one or more information elements. The "SpCellConfig" used herein refers to a configuration for the primary cell of a master or secondary cell group. The "SCellConfig" used herein refers to a configuration for the secondary cell of a master or secondary cell group. Only as an example, the RRCReconfiguration message can comprise the following information elements: masterCellGroup/MRDC-SecondaryCellGroupConfig→SpCellConfig/SCellConfig→MBS configuration.

In other embodiments, an information element "MBS configuration" can be included in an information element "DRB-ToAddMod" the RRCReconfiguration message. Only as an example, the RRCReconfiguration message can comprise the following information elements: RadioBearerConfig→DRB-ToAddMod. The information element "DRB-ToAddMod" used herein refers to configuration for the data radio bearer to be added or modified.

Alternatively or in addition, an information element "MBS configuration" can be included in an information element "LogicalChannelConfig" in RRCReconfiguration message. Only as an example, the RRCReconfiguration message can comprise the following information elements: CellGroupConfig→RLC-BearerConfig→LogicalChannelConfig. The term "LogicalChannelConfig" used herein refers to a configuration for the logical channel.

In some embodiments, the network device 220-1 can transmit the DCI associated with the identifier to the terminal device 210-1. In other embodiments, the network device 220-1 can transmit at least one data packet associated with the MBS service to the terminal device 210-1.

In some embodiments, the network device 220-1 can transmit additional information to the terminal device 210-1. The additional information used herein refer to information can be used to distinguish different content for the MBS service in different serving cells. In some embodiments, the additional information can be an index to distinguish different content for the MBS service. For example, contents of the MBS service in cells with different index are different. In some embodiments, the additional information can be determined by the network device 220-1. Alternatively, the additional information can be determined by the CN device 230.

In other embodiments, if the MBS service is location-dependent, the additional information can comprise an identity of an area in which certain content of the MBS service can be valid. For example, the additional information can indicate one or more validity areas for the MBS service.

In some embodiments, the additional information can be transmitted via a physical layer signaling. For instance, when the network device 220-1 transmits a data packet of the MBS service in the downlink, the additional information can be added in associated DCI for the data packet to indicate the associated cell or area of this data packet. In this situation, the additional information can be an area identity associate with the data packet. The term "area identity" used herein refer to an identity that can be used to identify the area. Alternatively, the additional information can comprise another identifier associate with the data packet. Alternatively, the additional information can be a cell identity associate with the data packet. The term "cell identity" used herein refer to an identity that can be used to identify the cell.

In some embodiments, the additional information can be transmitted via a MAC layer signaling. For example, the additional information can be included in MAC layer logical channel identifier (LCID). In this situation, the LCID can be used to indicate a cell or area associated with the at least one data packet. Alternatively, in another example, the additional information can be included in a MAC control element (MAC CE).

Example Apparatus

Figure 7:
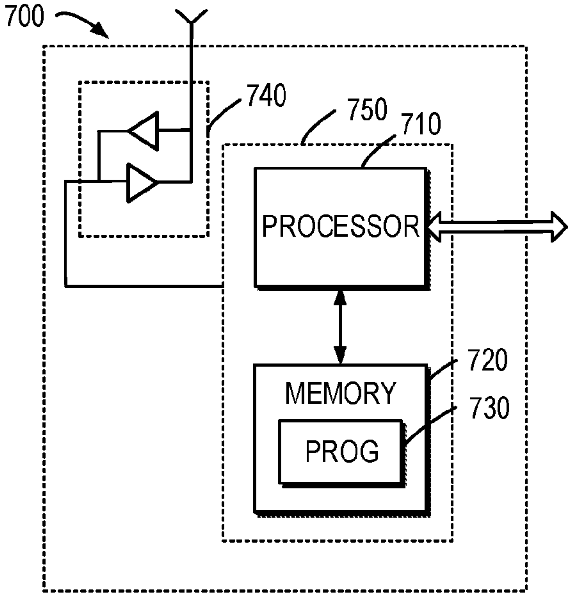
FIG. 7 illustrates a simplified block diagram of an apparatus that is suitable for implementing embodiments of the present disclosure.

FIG. 7 is a simplified block diagram of an apparatus 700 that is suitable for implementing embodiments of the present disclosure. The apparatus 700 can be considered as a further example implementation of the terminal device 210 as shown in FIG. 2. Accordingly, the apparatus 700 can be implemented at or as at least a part of the terminal device 210.

As shown, the apparatus 700 includes a processor 710, a memory 720 coupled to the processor 710, a suitable transmitter (TX) and receiver (RX) 740 coupled to the processor 710. The memory 710 stores at least a part of a program 730. The TX/RX 740 is for bidirectional communications. The TX/RX 740 is coupled to at least one antenna to facilitate communication, though, in practice, an Access Node mentioned in this application can have several antennas. The communication interface can represent any interface that is necessary for communication with other network elements, such as X2 interface for bidirectional communications between eNBs, Si interface for communication between a Mobility Management Entity (MME)/Serving Gateway (S-GW) and the eNB, Un interface for communication between the eNB and a relay node (RN), or Uu interface for communication between the eNB and a terminal device.

A program 730 is assumed to include program instructions that, when executed by the associated processor 710, enable the apparatus 700 to operate in accordance with the embodiments of the present disclosure, as discussed herein with reference to FIGS. 3-6. The embodiments herein can be implemented by computer software executable by the processor 710 of the apparatus 700, or by hardware, or by a combination of software and hardware. The processor 710 can be configured to implement various embodiments of the present disclosure. Furthermore, a combination of the processor 710 and memory 710 can form processing means 750 adapted to implement various embodiments of the present disclosure.

The memory 710 can be of any type suitable to the local technical network and can be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 710 is shown in the apparatus 700, there can be several physically distinct memory modules in the apparatus 700. The processor 710 can be of any type suitable to the local technical network, and can include one or more of general purpose computers, special purpose computers, microprocessors, digital signal processors (DSPs) and processors based on multicore processor architecture, as non-limiting examples. The apparatus 700 can have multiple processors, such as an application specific integrated circuit chip that is slaved in time to a clock which synchronizes the main processor.

In an exemplary embodiment, a method performed by a terminal device, comprising: receiving configuration information from a network device, the configuration information relating to a MBS service provided in one or more serving cells; receiving downlink control information from the one or more serving cells in which the MBS service is provided; and receiving the MBS service that is provided in the one or more serving cells based on the downlink control information.

In an exemplary embodiment, the configuration information is received in a Radio Resource Control (RRC)_Reconfiguration message.

In an exemplary embodiment, the identifier comprises a group-radio network temporary identity (G-RNTI).

In an exemplary embodiment, the configuration information comprises at least one of: MBS session information of the MBS service comprising at least one of: a temporary mobile group identity associated with the MBS service or a session identity associated with the MBS service, an indication regarding whether the MBS service is location dependent, at least one area identity associated with the MBS service if the MBS service is location dependent, indexes for distinguishing different contents of the MBS service received from different serving cells in the set of serving cells, an identifier associated with the MBS service, an indication regarding whether the MBS service is transmitted on one serving cell or a plurality of serving cells in the set of serving cells, or multimedia broadcast multicast service (MBMS) traffic channel (MTCH) scheduling information.

In an exemplary embodiment, receiving the configuration information comprises: receiving the configuration information via a message carrying one of: a configuration of the one or more serving cells, a configuration of a data radio bearer associated with the one or more serving cells, a configuration of a logical channel associated with the one or more serving cells.

In an exemplary embodiment, receiving the configuration information comprises: receiving the configuration information via one of: a radio resource control signaling, or a system information block.

In an exemplary embodiment, the method further comprises obtaining an identifier from the configuration information; and wherein receiving the downlink control information comprises: in accordance with a determination that the configuration information is received from the network device in a serving cell of the one or more serving cells, receiving the at least one downlink control information associated with the identifier in the serving cell.

In an exemplary embodiment, receiving the downlink control information associated with the identifier comprises: receiving the downlink control information associated with the identifier in the one or more serving cells.

In an exemplary embodiment, receiving the downlink control information comprises: obtaining, from the configuration information, a first indication regarding whether the MBS service is transmitted on one serving cell; and in accordance with a determination that the MBS service is transmitted on one serving cell, receiving, based on the first indication, the downlink control information in the serving cell on which the MBS is transmitted.

In an exemplary embodiment, the method further comprises: obtaining an identifier from the configuration information; and wherein receiving the downlink control information comprises: obtaining, from the configuration information, a second indication indicating a plurality of serving cells from the one or more serving cells on which the MBS service is transmitted; and receiving, based on the second indication, the at least one downlink control information associated with the identifier in the plurality of serving cells.

In an exemplary embodiment, the method further comprises receiving, from the network device, a search space configuration of a serving cell in the one or more serving cells; and receiving the downlink control information associated with the identifier comprises: in accordance with a determination that the search space configuration indicates that downlink control information of the serving cell is associated with the identifier, receiving the downlink control information in the serving cell.

In an exemplary embodiment, the method further comprises receiving, from the network device, additional information via a physical layer signaling, the additional information indicating one of: an area identity associated with a data packet of the MBS service, a cell identity associated with the data packet, another identifier associated with the one data packet; and associating the data packet with a target serving cell in the one or more serving cells based on the additional information.

In an exemplary embodiment, the method further comprises receiving, from the network device, additional information via a medium access control layer signaling, the additional information indicating one of: an area identity associated with a data packet of the MBS service, or a cell identity associated with the data packet; and associating the data packet with a target serving cell in the one or more serving cells based on the additional information.

In an exemplary embodiment, determining the identifier associated with the MBS service comprises: obtaining, based on the configuration information, a plurality of identifiers corresponding to a plurality of serving cells in the one or more serving cells; receiving the downlink control information comprises: in accordance with a determination that the configuration information indicates that the MBS service is location-dependent or contents of the MBS service from the plurality of serving cells are different, receiving a plurality of downlink control information associated with the plurality of identifiers in the plurality of serving cells.

In an exemplary embodiment, receiving the MBS service comprises: receiving a plurality of data packets associated with the MBS service in the plurality of serving cells.

In an exemplary embodiment, receiving the downlink control information comprises: in accordance with a determination that the configuration information indicates that contents of the MBS service from the plurality of serving cells are same, determining a target serving cell from the plurality of serving cells; determining, based on the configuration information, a target identifier corresponding to the target serving cell; and receiving the downlink control information associated with a target identifier corresponding to the target serving cell.

In an exemplary embodiment, receiving the MBS service comprises: receiving the at least one data packet associated with the MBS service from the target serving cell.

In an exemplary embodiment, the method further comprises determining another target serving cell from the plurality of serving cells; receiving the downlink control information associated with another target identifier corresponding to the other target serving cell; and wherein receiving the MBS service comprises: receiving at least one data packet associated with the MBS service from the target serving cell and the other target serving cell.

In an exemplary embodiment, a method performed by a network device, comprising:

determining configuration information relating to a MBS service for a terminal device; and transmitting the configuration information to the terminal device, wherein the configuration information indicates one or more serving cells for providing the MBS service.

In an exemplary embodiment, the configuration information is transmitted in a Radio Resource Control (RRC) _Reconfiguration message.

In an exemplary embodiment, the identifier comprises a group-radio network temporary identity (G-RNTI).

In an exemplary embodiment, the configuration information comprises at least one of: MBS session information of the MBS service comprising at least one of: a temporary mobile group identity associated with the MBS service or a session identity associated with the MBS service, an indication regarding whether the MBS service is location dependent, at least one area identity associated with the MBS service if the MBS service is location dependent, indexes for distinguishing different contents of the MBS service received from different serving cells in the set of serving cells, an identifier associated with the MBS service, an indication regarding whether the MBS service is transmitted on one serving cell or a plurality of serving cells in the set of serving cells, or multimedia broadcast multicast service (MBMS) traffic channel (MTCH) scheduling information.

In an exemplary embodiment, transmitting the configuration information comprises: transmitting the configuration information via a message carrying one of: a configuration of the one or more serving cells, a configuration of a data radio bearer associated with the one or more serving cells, a configuration of a logical channel associated with the one or more serving cells.

In an exemplary embodiment, transmitting the configuration information comprises: transmitting the configuration information via one of: a radio resource control signaling, or a system information block.

In an exemplary embodiment, the method further comprises transmitting, to the terminal device, a search space configuration of a serving cell in the set of serving cells, the search space configuration indicating that downlink control information of the serving cell is associated with an identifier associated with the MBS service.

In an exemplary embodiment, the method further comprises transmitting, to the terminal device, downlink control information associated with an identifier associated with the MBS service; and transmitting, to the terminal device, at least one data packet associated with the MBS service.

In an exemplary embodiment, the method further comprises transmitting, to the terminal device, additional information via a physical layer signaling, the additional information indicating one of: an area identity associated with the at least one data packet, a cell identity associated with the at least one data packet, another identifier associated with the at least one data packet.

In an exemplary embodiment, the method further comprises transmitting, to the terminal device, additional information via a medium access control layer signaling, the mapping information indicating one of: an area identity associated with the at least one data packet, or a cell identity associated with the at least one data packet.

Generally, various embodiments of the present disclosure can be implemented in hardware or special purpose circuits, software, logic or any combination thereof. Some aspects can be implemented in hardware, while other aspects can be implemented in firmware or software which can be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein can be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3-6. Generally, program modules include routines, programs, libraries, objects, classes, components, data structures, or the like that perform particular tasks or implement particular abstract data types. The functionality of the program modules can be combined or split between program modules as desired in various embodiments. Machine-executable instructions for program modules can be executed within a local or distributed device. In a distributed device, program modules can be located in both local and remote storage media.

Program code for carrying out methods of the present disclosure can be written in any combination of one or more programming languages. These program codes can be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code can execute entirely on a machine, partly on the machine, as a stand-alone software package, partly on the machine and partly on a remote machine or entirely on the remote machine or server.

The above program code can be embodied on a machine readable medium, which can be any tangible medium that can contain, or store a program for use by or in connection with an instruction execution system, apparatus, or device. The machine readable medium can be a machine readable signal medium or a machine readable storage medium. A machine readable medium can include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing can be advantageous. Likewise, while several specific implementation details are contained in the above discussions, these should not be construed as limitations on the scope of the present disclosure, but rather as descriptions of features that can be specific to particular embodiments. Certain features that are described in the context of separate embodiments can also be implemented in combination in a single embodiment. Conversely, various features that are described in the context of a single embodiment can also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

Reference to an element in the singular is not intended to mean "one and only one" unless explicitly so stated, but rather is intended to mean "one or more." Where a phrase similar to "any combination of A, B, C" is used herein, it is intended that the phrase be interpreted to mean that A alone can be present in an embodiment, B alone can be present in an embodiment, C alone can be present in an embodiment, and that any combination of the elements A, B, and C can be present in a single embodiment. For example, any combination of the elements A, B, and C includes the combinations of: A and B, A and C, B and C, and A and B and C can each be present in an embodiment.

When elements, such as A and B, are described as being "A/B" or a "/" is used, then the description is intended to cover all the following combinations: A alone, B alone, or A and B together.

What is claimed is:

1. A terminal device for wireless communication, comprising:

at least one memory; and at least one processor coupled with the at least one memory and configured to cause the terminal device to:

receive, from a network device, a search space configuration of a specific serving cell of one or more serving cells, wherein the search space configuration indicates that downlink control information (DCI) of the specific serving cell is associated with an identifier (ID) of a multicast and broadcast service (MBS) service from a plurality of MBS services associated with the specific serving cell;

receive, from the network device, configuration information relating to a MBS service provided in the one or more serving cells, wherein the configuration information further indicates to monitor a search space associated with the specific serving cell;

receive the DCI from the one or more serving cells in which the MBS service is provided based on the search space configuration; and receive the MBS service that is provided in the one or more serving cells based on the downlink control information.

2. The terminal device of claim 1, wherein the configuration information is received in at least one of:

a Radio Resource Control (RRC)_Reconfiguration message, a radio resource control signaling, or a system information block.

3. The terminal device of claim 1, wherein the configuration information comprises at least one of:

MBS session information of the MBS service comprising at least one of: a temporary mobile group identity associated with the MBS service or a session identity associated with the MBS service, an indication regarding whether the MBS service is location dependent, at least one area identity associated with the MBS service if the MBS service is location dependent, indexes for distinguishing different contents of the MBS service received from different serving cells in a set of serving cells, an ID associated with the MBS service, an indication regarding whether the MBS service is transmitted on one serving cell or a plurality of serving cells in the set of serving cells, or multimedia broadcast multicast service (MBMS) traffic channel (MTCH) scheduling information.

4. The terminal device of claim 1, wherein to receive the configuration information, the at least one processor is configured to cause the terminal device to:

receive the configuration information via a message carrying at least one of:

a configuration of the one or more serving cells, a configuration of a data radio bearer associated with the one or more serving cells, or a configuration of a logical channel associated with the one or more serving cells.

5. The terminal device of claim 1, wherein the at least one processor is configured to cause the terminal device to:

obtain an ID associated with the MBS service from the configuration information wherein, to receive the downlink control information, the at least one processor is configured to cause the terminal device to:

receive, in accordance with a determination that the configuration information is received from the network device in a serving cell of the one or more serving cells, the downlink control information associated with the ID in the serving cell.

6. The terminal device of claim 1, wherein to receive the downlink control information, the at least one processor is configured to cause the terminal device to:

obtain, from the configuration information, a first indication regarding whether the MBS service is transmitted on a serving cell; and receive, in accordance with a determination that the MBS service is transmitted on the serving cell, and based on the first indication, the downlink control information in the specific serving cell on which the MBS service is transmitted.

7. The terminal device of claim 1, wherein the at least one processor is configured to cause the terminal device to:

obtain an ID associated with the MBS service from the configuration information wherein, to receive the downlink control information, the at least one processor is configured to cause the terminal device to:

obtain, from the configuration information, a second indication indicating a plurality of serving cells from the one or more serving cells on which the MBS service is transmitted; and receive, based on the second indication, the downlink control information in the plurality of serving cells.

8. The terminal device of claim 1, wherein, to receive the downlink control information, the at least one processor is configured to cause the terminal device to:

receive, in accordance with a determination that the search space configuration indicates that the DCI of the specific serving cell is associated with the ID associated with the MBS service, the DCI in the specific serving cell.

9. The terminal device of claim 1, wherein the at least one processor is configured to cause the terminal device to:

receive, from the network device, additional information via a physical layer signaling or via a medium access control (MAC) layer signaling, the additional information indicating at least one of an area identity associated with a data packet of the MBS service, a cell identity associated with the data packet, or another ID associated with the data packet; and associate the data packet with a target serving cell in the one or more serving cells based on the additional information.

10. The terminal device of claim 1, wherein the at least one processor is configured to cause the terminal device to:

obtain, based on the configuration information, a plurality of IDs corresponding to a plurality of serving cells in the one or more serving cells, wherein, to receive the DCI, the at least one processor is configured to cause the terminal device to:

receive, in accordance with a determination that the configuration information indicates that the MBS service is location-dependent or contents of the MBS service from the plurality of serving cells are different, a plurality of DCI associated with the plurality of IDs in the plurality of serving cells; and wherein to receive the MBS service, the at least one processor is configured to cause the terminal device to:

receive a plurality of data packets associated with the MBS service in the plurality of serving cells.

11. The terminal device of claim 1, wherein the at least one processor is configured to cause the terminal device to:

obtain, based on the configuration information, a plurality of IDs corresponding to a plurality of serving cells in the one or more serving cells wherein, to receive the DCI, the at least one processor is configured to cause the terminal device to:

determine, in accordance with a determination that the configuration information indicates that contents of the MBS service from the plurality of serving cells are same, a target serving cell from the plurality of serving cells;

determine, based on the configuration information, a target ID corresponding to the target serving cell;

receive the DCI associated with the target ID in the target serving cell; and receive at least one data packet associated with the MBS service from the target serving cell.

12. The terminal device of claim 11, wherein the at least one processor is configured to cause the terminal device to:

determine another target serving cell from the plurality of serving cells;

receive the DCI associated with another target ID corresponding to the other target serving cell; and wherein, to receive the MBS service, the at least one processor is configured to cause the terminal device to:

receive at least one data packet associated with the MBS service from the target serving cell and the other target serving cell.

13. A network device for wireless communication, comprising:

at least one memory; and at least one processor coupled with the at least one memory, the at least one processor configured to cause the network device to:

transmit, to a terminal device, a search space configuration of a specific serving cell of one or more serving cells, wherein the search space configuration indicates that downlink control information (DCI) of the specific serving cell is associated with an identifier (ID) of a multicast and broadcast service (MBS) service from a plurality of MBS services associated with the specific serving cell; and transmit, to the terminal device, configuration information relating to a MBS service provided in the one or more serving cells, wherein the configuration information further indicates to monitor a search space associated with the specific serving cell.

14. A method performed by a terminal device, the method comprising:

receiving, from a network device, a search space configuration of a specific serving cell of one or more serving cells, wherein the search space configuration indicates that downlink control information (DCI) of the specific serving cell is associated with an identifier (ID) of a multicast and broadcast service (MBS) service from a plurality of MBS services associated with the specific serving cell;

receiving, from the network device, configuration information relating to a MBS service provided in the one or more serving cells, wherein the configuration information further indicates to monitor a search space associated with the specific serving cell;

receiving DCI information from the one or more serving cells in which the MBS service is provided based on the search space configuration; and receiving the MBS service that is provided in the one or more serving cells based on the DCI.

15. The method of claim 14, wherein the configuration information is received in at least one of:

a Radio Resource Control (RRC)_Reconfiguration message, a radio resource control signaling, or a system information block.

16. The method of claim 14, wherein the configuration information comprises at least one of:

MBS session information of the MBS service comprising at least one of:

a temporary mobile group identity associated with the MBS service or a session identity associated with the MBS service, an indication regarding whether the MBS service is location dependent, at least one area identity associated with the MBS service if the MBS service is location dependent, indexes for distinguishing different contents of the MBS service received from different serving cells of the one or more serving cells, an ID associated with the MBS service, an indication regarding whether the MBS service is transmitted on one serving cell or a plurality of serving cells in a set of serving cells, or multimedia broadcast multicast service (MBMS) traffic channel (MTCH) scheduling information.

17. The method of claim 14, wherein receiving the configuration information comprises:

receiving the configuration information via a message carrying one of:

a configuration of the one or more serving cells;

a configuration of a data radio bearer associated with the one or more serving cells; or a configuration of a logical channel associated with the one or more serving cells.

18. The method of claim 14, further comprising:

obtaining an ID associated with the MBS service from the configuration information; and wherein receiving the DCI comprises:

in accordance with a determination that the configuration information is received from the network device in a serving cell of the one or more serving cells, receiving the DCI associated with the ID in the serving cell.

19. The method of claim 14, wherein receiving the DCI comprises:

obtaining, from the configuration information, a first indication regarding whether the MBS service is transmitted on a serving cell; and in accordance with a determination that the MBS service is transmitted on the serving cell, receiving, based on the first indication, the DCI in the serving cell on which the MBS service is transmitted.

20. A method performed by a network device, the method comprising:

transmitting, to a terminal device, a search space configuration of a specific serving cell of one or more serving cells, wherein the search space configuration indicates that downlink control information (DCI) of the specific serving cell is associated with an identifier (ID) of a multicast and broadcast service (MBS) service from a plurality of MBS services associated with the specific serving cell; and transmitting, to the terminal device, configuration information relating to a MBS service provided in the one or more serving cells, wherein the configuration information further indicates to monitor a search space associated with the specific serving cell.

* * * * *